United States Patent [19]

Inaga et al.

[11] Patent Number: 4,507,865
[45] Date of Patent: Apr. 2, 1985

[54] GRASS TRIMMER

[75] Inventors: Hisashi Inaga, Tokyo; Kozi Ohtagawa, Hachioji, both of Japan

[73] Assignee: Kioritz Corporation, Tokyo, Japan

[21] Appl. No.: 553,652

[22] Filed: Nov. 21, 1983

[30] Foreign Application Priority Data

Dec. 16, 1982 [JP] Japan .......................... 57-189219[U]

[51] Int. Cl.³ .............................................. A01D 55/18
[52] U.S. Cl. ....................................... 30/276; 29/463; 30/240
[58] Field of Search ......................... 29/463; 74/606 R; 30/276, 347, 122, 240

[56] References Cited

U.S. PATENT DOCUMENTS

| | | | |
|---|---|---|---|
| 2,378,961 | 6/1945 | Wallace | 29/463 X |
| 2,755,045 | 7/1956 | Schmidt | 29/463 X |
| 2,810,409 | 10/1957 | Ibelle | 30/122 |
| 3,453,732 | 7/1969 | Wilkin | 30/276 X |
| 3,781,991 | 1/1974 | Stretton | 30/276 |
| 4,321,838 | 3/1982 | Feldman | 30/122 |
| 4,381,605 | 5/1983 | Holm | 30/240 |
| 4,441,241 | 4/1984 | Hoeffken | 29/463 |

Primary Examiner—Jimmy C. Peters
Attorney, Agent, or Firm—Karl W. Flocks; Sheridan Neimark

[57] ABSTRACT

A grass trimmer has an elongated operation rod, a prime mover mounted on one end of the operation shaft, a transmission shaft extended through the operation rod, a gear box connected at its one end to the other end of the operation rod, and a cutting blade member connected to a blade driving shaft projected from the other end of the gear box, the transmission shaft and the blade driving shaft being drivingly connected to each other through gears within the gear box. The gear box 5 is composed of a plurality of steel sheets 7,8 which are shaped beforehand to define, when assembled together, a hollow 17 of a circular cross-section and to have longitudinal flanges 9,9 and 10,10. The steel sheets 7,8 are joined to each other to form the gear box in one body by hemming along the flanges 9,9 and 10,10 such that the flanges are superposed and folded one on the other to form fold-back portions 11,11 along the length of the gear box 5. The fold-back portions effectively increases the stiffness of the gear box 5 and, hence, improves the resistance of the same against impact.

1 Claim, 4 Drawing Figures

4,507,865

GRASS TRIMMER

BACKGROUND OF THE INVENTION

The present invention relates to a grass trimmer.

In the grass trimmer for use in, for example, grass cutting, there is a demand to reduce as much as possible the weight of the head portion including the grass cutting blade, in order to improve the handling characteristics of the machine. Generally, the grass trimmer has an elongated operation rod accomodating a transmission shaft and a gear mechanism through which the transmission shaft is drivingly connected to a blade driving shaft. The gear mechanism is housed by a gear box which is connected to the end of the elongated rod and made by die-casting from a light-weight material such as an aluminum alloy, in order to cope with the above-mentioned demand.

The die-cast articles, however, generally exhibit small resistance to impact. Therefore, when the operation rod is swung to the left and right during the operation of the machine, it is often experienced that the gear box is broken by an impact due to collision with, for example, a large stone. In the worst case, the broken gear box fly dangerously together with the cutting blade away from the rod.

SUMMARY OF THE INVENTION

Accordingly, it is an object of the invention to provide a grass trimmer having a gear box made of steel sheets united by hemming thereby to enhance the safety in the trimming work.

To this end, according to the invention, there is provided a grass trimmer having an elongated operation rod, an engine mounted on one end of the operation rod, a transmission shaft extended through the operation rod, a gear box connected at its one end to the other end of the operation rod, and a cutting blade connected to a blade driving shaft projected from the other end of the gear box, the transmission shaft and the blade driving shaft being drivingly connected to each other through gears within the gear box, wherein the improvement comprises that the gear box is composed of a plurality of steel sheets which are shaped beforehand to define, when assembled together, a hollow of a circular cross-section and to have longitudinal flanges, the steel sheets being jointed to each other to form the gear box in one body by hemming along the flanges such that the flanges are superposed and folded back one on the other to form fold-back portions along the length of the gear box.

Since the gear box is made up from steel sheets which are united into one body by hemming at their flanges such that the fold-back portions are formed along the length of the gear box, the gear box is effectively stiffened by the fold-back portions extending along the length thereof. According to the invention, therefore, the grass trimmer can have a gear box which exhibits a higher resistance to impact that the conventional ones without substantial increase of the weight, so that a higher safety is ensured in the trimming operation.

The above and other objects, features and advantages of the invention will become clear from the following description of the preferred embodiments taken in conjunction with the accompanying drawings.

DESCRIPTION OF THE PREFERRED EMBODIMENT

Figure 1:
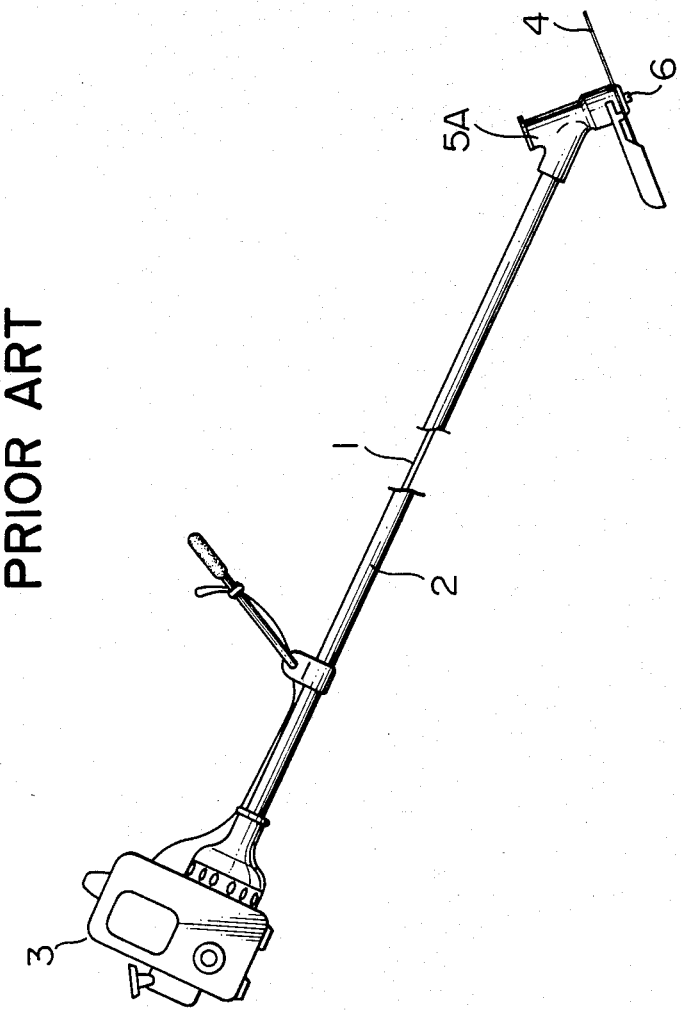
FIG. 1 is a side elevational view of a conventional grass trimmer.

FIG. 1 shows a well-known grass trimmer driven by a prime mover such as an air-cooled 2-cycle gasoline engine 3 attached to the base end of an elongated operation rod 2 through which extended is a transmission shaft 1. A grass-cutting blade 4 is fixed to a blade driving shaft 6 which projects downwardly from a gear box 5A attached to the head end of the operation rod 2. As stated before, the gear box 5A is usually made by die-casting from a light metal such as an aluminum alloy, so that the problem as explained before is encountered due to insufficient resistance against impact.

In order to obviate this problem, according to the invention, the grass trimmer is provided with a gear box 5 made by hemming from steel sheets which are shaped beforehand by press work.

Figure 2:
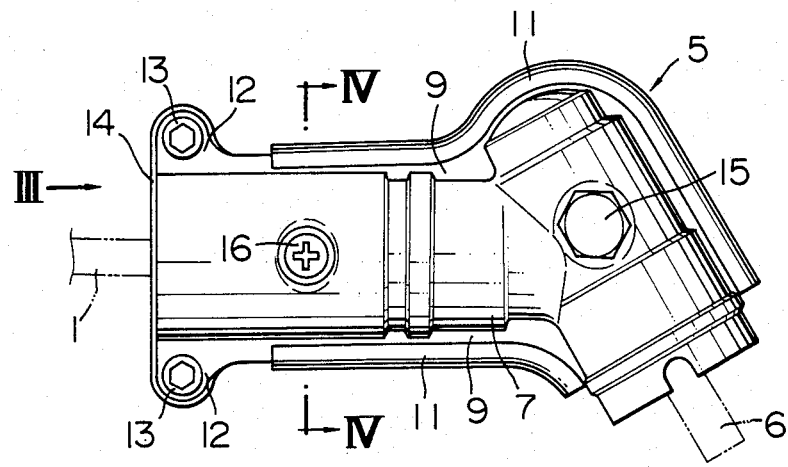
FIG. 2 is an enlarged side elevational view of the gear box of a grass trimmer in accordance with the present invention.
Figure 3:
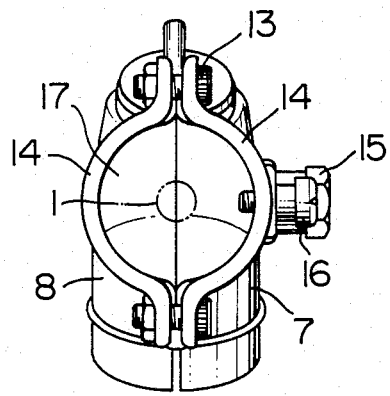
FIG. 3 is an end view of the gear box as viewed in the direction of the arrow III in FIG. 2.
Figure 4:
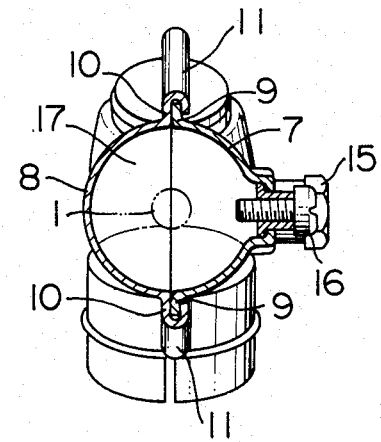
FIG. 4 is a sectional view taken along the line IV—IV of FIG. 2.

FIG. 2 shows in a larger scale the gear box 5 incorporated in the grass trimmer of the invention. As will be seen from this Figure, the gear box is a hollow member opened at its both ends and curved at an intermediate portion thereof. The operation rod 2 is inserted into the gear box 5 through one end (left end as viewed in FIG. 2) thereof while the blade driving shaft 6 extends out of the gear box 5 through the other end of the gear box 5. The gears (not shown) fixed to the transmission shaft 1 and the blade driving shaft 6 mesh with each other within the hollow 17 of the gear box 5.

According to the invention, the gear box 5 is split into two halves along the length thereof, i.e. along the axis of the transmission shaft 1 and the axis of the blade driving shaft 6. Both halves are constituted by steel sheets 7 and 8 of about 1 mm thick, and are shaped beforehand by a precision press to have a semi-circular cross-section with flanges 9,9 and 10,10 at their upper and lower ends. These two halves are brought together such that the flanges 9,9 and 10,10 lap each other and the longer flanges 10,10 are folded back on the shorter flanges 9,9 at the upper and lower sides of the gear box 5 thereby to form fold-back portions 11 and 11 along the length of the gear box 5. Preferably, the halves 7 and 8 of the gear box are provided with flanges 14,14 also at their left end portions defining the left end opening receiving the operation rod 2. These flanges 14 and 14 effectively stiffens the gear box 5 and facilitates the assembling of the same. Screws 13 and 13 for fastening the operation rod 2 are screwed through lugs 12 and 12 formed on the halves 7 and 8 of the gear box 5 at portions of the latter adjacent to the flanges 14 and 14. A screw 16 for fixing the operation rod 2 against rotation is screwed into the right side portion of the gear box 5 on the axis of the operation rod 2. It is also preferred to provide a grease cup or plug on the right side portion of the gear box 5 on the axis of the blade driving shaft 6.

Although the invention has been described through specific terms, it is to be noted here that the described embodiment is not exclusive and various changes and modifications may be imparted thereto without departing from the scope of the invention which is limited solely by the apended claim.

What is claimed is:

1. A grass trimmer having an elongated operation rod, a prime mover mounted on one end of said operation rod, a transmission shaft extended through said operation rod, a gear box connected at its one end to the other end of said operation rod, and a cutting blade member connected to a blade driving shaft projected from the other end of said gear box, said transmission shaft and said blade driving shaft being drivingly connected to each other through gears within said gear box, wherein the improvement comprises that said gear box 5 is composed of a plurality of steel sheets 7,8 which are shaped beforehand to define, when assembled together, a hollow 17 of a circular cross-section and to have longitudinal flanges 9,9 and 10,10, said steel sheets being jointed to each other to form said gear box in one body by hemming along said flanges 9,9 and 10,10 such that said flanges 9,9 and 10,10 are superposed and folded back one on the other to form fold-back portions 11,11 along the length of the gear box.

* * * * *